(12) United States Patent
Weniger et al.

(10) Patent No.: US 8,031,674 B2
(45) Date of Patent: Oct. 4, 2011

(54) OPTIMIZED REVERSE TUNNELLING FOR PACKET SWITCHED MOBILE COMMUNICATION SYSTEMS

(75) Inventors: Kilian Weniger, Langen (DE); Jens Bachmann, Langen (DE)

(73) Assignee: Panasonic Corporation, Osaka (JP)

( * ) Notice: Subject to any disclaimer, the term of this patent is extended or adjusted under 35 U.S.C. 154(b) by 902 days.

(21) Appl. No.: 11/993,962

(22) PCT Filed: Apr. 28, 2006

(86) PCT No.: PCT/EP2006/004025
§ 371 (c)(1),
(2), (4) Date: Feb. 15, 2008

(87) PCT Pub. No.: WO2007/003240
PCT Pub. Date: Jan. 11, 2007

(65) Prior Publication Data
US 2008/0198805 A1    Aug. 21, 2008

(30) Foreign Application Priority Data
Jun. 30, 2005    (EP) .................................. 05014239

(51) Int. Cl.
H04W 4/00    (2009.01)
H04B 7/00    (2006.01)

(52) U.S. Cl. .................... 370/331; 370/338; 455/525

(58) Field of Classification Search ............... 370/331, 370/338; 455/525
See application file for complete search history.

(56) References Cited

U.S. PATENT DOCUMENTS

| | | | |
|---|---|---|---|
| 2002/0133534 A1* | 9/2002 | Forslow | 709/200 |
| 2003/0093553 A1 | 5/2003 | Le | |
| 2003/0228868 A1 | 12/2003 | Turanyi | |
| 2004/0236937 A1* | 11/2004 | Perkins et al. | 713/150 |
| 2005/0055576 A1 | 3/2005 | Mononen | |
| 2005/0058099 A1* | 3/2005 | Hernandez-Mondragon et al. | 370/331 |
| 2005/0063352 A1* | 3/2005 | Amara et al. | 370/338 |
| 2005/0088994 A1 | 4/2005 | Maenpaa | |
| 2008/0031140 A1* | 2/2008 | Suh et al. | 370/238 |

FOREIGN PATENT DOCUMENTS

| | | |
|---|---|---|
| EP | 0 578 041 | 1/1994 |
| EP | 1 524 805 | 4/2005 |
| WO | 2004/010668 | 1/2004 |

OTHER PUBLICATIONS

International Search Report dated Jul. 31, 2006.
M. Spreitzer, et al., "Architectural considerations for scalable, secure, mobile computing with location information," Distributed Computing Systems, 1994, Proceedings of the 14th International Conference on Pozman, Poland, Jun. 1994, IEEE Comput. Soc., Jun. 1994, pp. 29-38.

* cited by examiner

*Primary Examiner* — Kenny Lin
(74) *Attorney, Agent, or Firm* — Dickinson Wright PLLC

(57) ABSTRACT

A method and a server acting as a Home Agent are provided for packet switched data transmission between a first mobile node and a correspondent mobile node in a mobile communication system comprising a plurality of mobile networks. Each of the first mobile node and the correspondent mobile node are allocated to respective home networks, and a network server is provided as a home agent to each mobile node, respectively. Then, data packets are routed from the first mobile node to the correspondent mobile node, over a first data tunnel from the first mobile node to any first one of the home agents and over a second data tunnel from said first one of the home agents to the correspondent mobile node without passing the respective other home agent.

19 Claims, 9 Drawing Sheets

OPTIMIZED REVERSE TUNNELLING FOR PACKET SWITCHED MOBILE COMMUNICATION SYSTEMS

BACKGROUND OF THE INVENTION

1. Field of the Invention

The invention is related to mobile communications systems. More specifically, it relates to location privacy and route optimization for mobile communication based on the Mobile Internet Protocol (Mobile IP) or similar protocols.

2. Description of the Related Art

The invention is described for the example of the Mobile Internet protocol Version 6 (Mobile IPv6). It is, however, also applicable to other protocols defining equivalent entities corresponding to the described entities of the Mobile IP.

Mobile IPv6 currently defines two modes of operation: bi-directional tunnelling and route optimization. While the former mode requires all data packets to be routed over the home agent of the sending mobile node, the latter utilizes the direct path between mobile node and correspondent.

If a Mobile Node (MN) moves between subnets, it must change its IP address to a topologically correct one. The reason is the hierarchical routing structure of the Internet, i.e. the IP addresses do not only serve identification purposes, but also contain location information. However, since connections on higher layers such as TCP are defined with the IP addresses (and port) of the communicating nodes, the connection breaks if one of the nodes changes its IP address, e.g. due to movement.

Mobile IPv6 [D. Johnson, C. Perkins, J. Arkko, "Mobility Support in IPv6", IETF RFC 3775, June 2004] is a layer 3 mobility protocol that enables Mobile Nodes (MNs) to move between subnets in a transparent manner for higher layers, i.e. without breaking higher layer connections. To this end, a MN uses two IP addresses: a Care-of-Address (CoA) and a Home Address (HoA). The MN's higher layers use the HoA for communication with the Correspondent Node (CN). This address does not change and serves the purpose of identification of the MN. Topologically, it belongs to the Home Network (HN) of the MN. In contrast, the CoA changes on every movement resulting in a subnet change and is used as the locator for the routing infrastructure. Topologically, it belongs to the network the MN is currently visiting. One out of a set of Home Agents (HA) located on the home link maintains a mapping of the MN's CoA to MN's HoA and redirects incoming traffic for the MN to its current location. Fur the purpose of redundancy and load balancing, a set of HAs may be used instead of a single HA.

Mobile IPv6 currently defines two modes of operation: bi-directional tunnelling and route optimization. If bi-directional tunnelling is used, data packets sent by the CN and addressed to the HoA of the MN are intercepted by the HA in the home network and tunnelled to the CoA of the MN. Data packets sent by the MN are reverse tunnelled to the HA which decapsulates the packets and sends them to the CN. For this operation, only the HA must be informed about the CoA of the MN. Therefore, the MN sends Binding Update (BU) messages to the HA. These messages are sent over an IPsec security association and thus are authenticated. Since the CN is not aware of the CoA of the MN, it cannot derive the location of the MN and thus location privacy is provided. However, if the MN is far away from the home network and the CN is close to the MN, the communication path is unnecessarily long, resulting in inefficient routing and high packet delays.

Note that different types of location privacy can be distinguished. The one this invention aims at is hiding the MN's location (and thus CoA) to the CN. Other types are hiding the location to eavesdroppers or preventing tracking of the MN's location.

The route optimization mode can prevent the described inefficiency by using the direct path between CN and MN. Therefore, the MN sends BU messages to the CN, which then is able to directly tunnel packets to the MN (actually, a type 2 routing header is used instead of an IP-in-IP tunnel). Of course, the CN has to support Mobile IPv6 route optimization. To authenticate the BU message, the MN and the CN perform a so-called return routability procedure, which tests the reachability of the MN at the HoA and CoA and generates a shared session key. However, since the CN learns the CoA of the MN by means of the BU message, it can derive its location, i.e. location privacy is not provided.

A mechanism that provides both location privacy and route optimization is certainly desirable, since interactive applications such as VoIP require short packet delays. Various approaches can be used to achieve this goal, some of them designed for other purposes. However, all of them introduce new infrastructure components (or require changes to existing components) in the visited networks. If the current visited network does not provide such components, location privacy and route optimization is not available, meaning that privacy-protected interactive communication may not be possible. A global deployment of such new components, i.e. in each access network, may take long time or may even never be accomplished. Other solutions only provide location privacy in one direction, i.e. location information is revealed only to at least one of the nodes if both communication partners are mobile. Some other solutions have scalability issues when deployed in large scale. A solution is desired that does not require the introduction of new or modified components in the visited network, works also when both communication partners are mobile and does scale well with respect to deployment. This invention describes such a solution.

Approaches that introduce new infrastructure components are Hierarchical Mobile IPv6 (HMIP), Access Router Encapsulation Caches (AREC), Optimized Route Caches (ORC), Global Home Agent to Home Agent Protocol (Global-HAHA), WO03041358, WO2004010668 and US2005041675. These approaches are briefly described in the following.

HMIP [Hesham Soliman, Claude Catelluccia, Karim El Malki, Ludovic Bellier, "Hierarchical Mobile IPv6 mobility management (HMIPv6)", IETF Internet Draft draft-ietf-mipshop-hmipv6-04.txt, December 2004] was developed to reduce the latency and signalling overhead occurring due to BU messages sent to a HA (potentially being far away). Therefore, a local mobility handling is proposed by introducing a hierarchy of Mobility Anchor Points (MAP) in the visited network. The MN only needs to register its CoA with the local MAP. An additional CoA, the so-called Regional CoA (RCoA), is obtained from the MAP's subnet and used by the MAP to hide the MN's mobility within the MAP's region from the HA (or the CN in case of route optimization). Since the HA or the CN still knows the RCoA, full location privacy support is not given. However, because the geographical region that can be derived from the RCoA is larger than the region that can be derived from the actual CoA, this can be regarded as limited location privacy support.

AREC [WO2004055993] [G. Krishnamurthi, H. Chaskar, R. Siren, "Providing End-to-End Location Privacy in IP-based Mobile Communication", IEEE WCNC, March 2004] requires modifications in every Access Router (AR) of every visited network. Assuming that binding information is provided to the current ARs of the CN and MN, respectively, data packets can be tunnelled between both ARs without involvement of an HA, the CN or the MN. This way, the direct, i.e. shortest, route between MN and CN is used and location privacy is supported. A very similar approach is presented in WO2004010668.

ORC [Ryuji Wakikawa, "Optimized Route Cache Protocol (ORC)", Internet Draft draft-wakikawa-nemo-orc-01.txt, October 2004] was developed for route optimization in mobile networks (NEMO) and requires modifications to edge routers of visited networks, including the provision of binding information. The MN tunnels data packets to the edge router of the CN's current network (assuming that the CN is mobile) and the CN can tunnel data packets to the edge router of the MN's current visited network. To be able to tunnel the packets to the edge routers, each node needs to know the IP address of the correspondent edge router, which again reveals location information about the correspondent MN.

GlobalHAHA [P. Thubert, R. Wakikawa, V. Devarapalli, "Global HA to HA protocol", IETF Internet Draft draft-thubert-nemo-global-haha-00, October 2004] distributes HAs in the Internet that are usually bound to the home link by letting multiple HAs advertise routes to the home network prefix from different topological locations. A MN can bind to the closest HA, which serves as proxy HA, resulting in an optimized route. Location privacy is given if bi-directional tunnelling is used. However, if every visited network advertise routes to all other networks (all being home networks for some MNs), routing scalability issues may arise, since the address hierarchy is not given anymore. Also, the distributed home network must manually be configured as such. An secure on-demand configuration is not supported.

In WO03041358 so-called Location Privacy Agents (LPA) and Location Privacy Servers (LPS) are introduced in every network. The MN sends a location privacy request message to its LPA, which then selects an LPA that is close to the CN. The address of this LPA is then given to the MN, which then sends a BU message to this LPA. Hence, the approach is similar to the ORC approach: since the LPA is close to CN's network, it knows the location of CN to some extend, which breaks location privacy support if the CN is mobile.

In US2005041675 and WO2004043010 location privacy is achieved by cryptographically modified prefixes of IP addresses. Since the prefix is usually used by a router to route IP packets, this approach requires the modification of all routers in the Internet.

In WO03044626, multicast addresses are used as CoA. Since they do not include any location information, location privacy support is given even in route optimization mode. However, this solution does not scale with the number of MNs, since a large-scale deployment would result in a flat routing in the Internet.

SUMMARY OF THE INVENTION

It is an object of the present invention to provide location privacy and route optimization for packet switching protocols like Mobile IPv6 without requiring the introduction of new or modified infrastructure components in every visited network. The solution shall also work when both communication partners are mobile and shall scale well with respect to deployment, i.e. number of MNs using the solution. It shall also provide the same level of security as standard Mobile IPv6.

These objects are achieved by the use of bi-directional tunnelling for location privacy support and by subsequent optimization of the route by providing other HAs with binding information, which then perform proxy functionality in terms of bi-directional tunnelling. Other than in previous approaches, the proxy functionality only applies to the tunnelling of data packets, only to a specific MN-CN communication session, and is established in a secure and on-demand manner. This invention describes mechanisms for discovering the best suited proxy locations, establishing the proxy functionality in a secure and on-demand manner and for adapting the path after node movements.

In one aspect of the present invention, a method for packet switched data transmission between a first mobile node (101) and a correspondent mobile node (102) in a mobile communication system comprising a plurality of mobile networks (105, 106, 107, 108), comprises the steps of a) allocating a respective home network (105, 106) to each of the first mobile node and the correspondent mobile node; b) providing a network server (103, 104) as home agent in the respective home network to each of the first mobile node and the correspondent mobile node; and c) routing data packets from the first mobile node to the correspondent mobile node, over a first data tunnel (201, 301) from the first mobile node to any first one of the home agents and over a second data tunnel (202, 302) from said first one of the home agents to the correspondent mobile node without passing the respective other home agent.

In another aspect of the present invention, a network server (1300) is configured to serve as a home agent (103) for a first mobile node (101) sending data packets to a correspondent mobile node (102) in a mobile communication system comprising a plurality of mobile networks (105, 106, 107, 108). The server is further configured to establish a data tunnel (202, 302) directly to said correspondent mobile node without passing a home agent (104) of said correspondent mobile node, for the purpose of forwarding data packets received from said first mobile node to said correspondent mobile node.

In a further aspect of the present invention, a computer-readable storage medium (1304, 1305, 1310) has stored thereon instructions which, when executed on a processor (1301) of a network server (1300), cause the network server to serve as a home agent (103) for a first mobile node (101) sending data packets to a correspondent mobile node (102) in a mobile communication system comprising a plurality of mobile networks (105, 106, 107, 108), and to establish a data tunnel directly to said correspondent mobile node without passing a home agent (104) of said correspondent mobile node, for the purpose of forwarding data packets received from said first mobile node to said correspondent mobile node.

The present invention allows to optimize the routing of data packets between two roaming mobile nodes without revealing the location of the mobile nodes to the respective other one. Furthermore undue implementation effort is avoided because no new entities are required. Additionally required functionality in the home agents is relatively modest, and compatibility with existing methods is maintained, which allows a partial or successive implementation of the invention in larger systems.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings, wherein like elements and structures are indicated by like reference numbers.

Optimized Reverse Tunnelling (ORT) first requires some initial signalling between MN or MN's HA and CN or CN's HA to negotiate privacy as well as route optimization requirements of MN and CN. Based on this and additional distance information, candidate scenarios and, subsequently, candidate proxy HAs are determined. After determining the route lengths over the individual candidate proxy HAs, it is decided whether and to which proxy HA(s) tunnels will be switched. Then, binding information is sent and tunnels are switched to the selected target proxy HA(s). Due to mobility, the route lengths are dynamic and the process must be repeated at certain instances in time.

In the following, the individual procedures are described, i.e. the negotiation of requirements and candidate scenarios, the discovery of candidate proxy HAs, the determination of target proxy HA(s) based on distance information/route lengths, the establishment of binding information in a target proxy HA in a secure manner, and the switching of tunnels. The procedures can be realized either in a MN-controlled or an HA-controlled manner. Finally, it is described how the route can be adapted in the presence of mobility.

It is assumed, that an HA is assigned to the CN, either because the CN is mobile or because the CN registers with an HA to support ORT even if it is at home. If this is not the case, ORT is rejected in the initial negotiation phase.

Requirements and Candidate Scenario Negotiation

Figure 1:
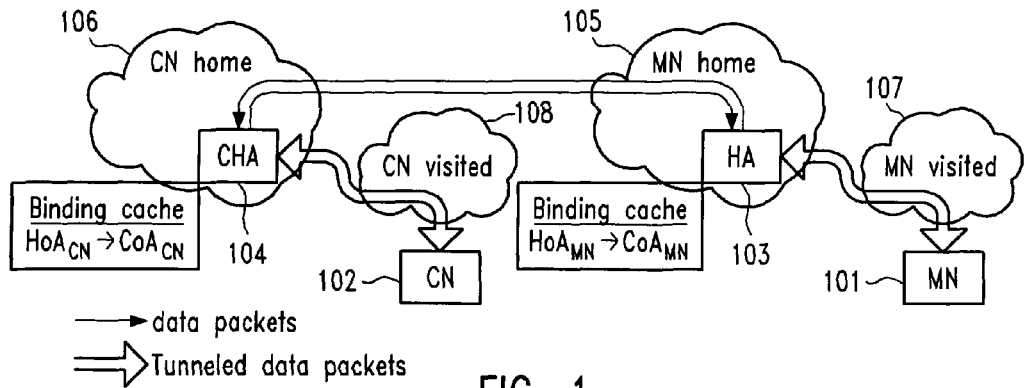
FIG. 1 shows the data path between MN and CN without proxy HAs in bi-directional tunnelling mode.
Figure 4:
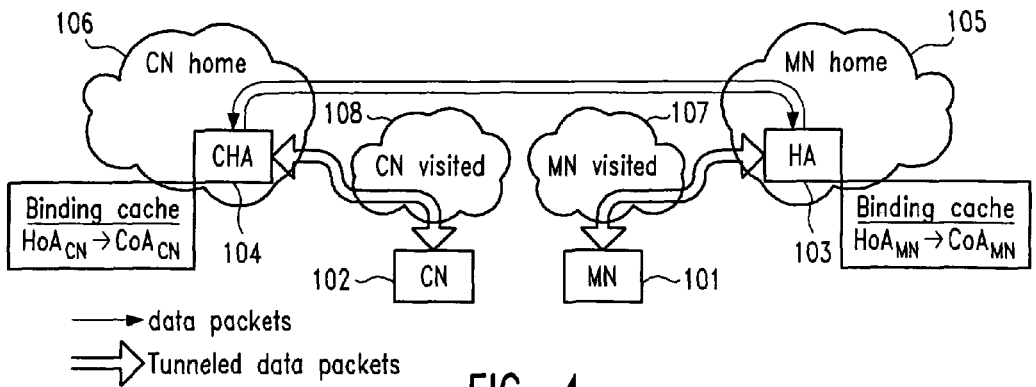
FIG. 4 shows the same scenario as FIG. 1 with different distances between the entities.

The starting scenario is always standard Mobile IP in bi-directional tunnelling mode. FIGS. 1 and 4 show the data path in this mode between the MN 101 and the CN 102 both being in foreign networks 107 and 108. The MN reverse tunnels all data packets addressed to CN's HoA to its HA 103, which decapsulates and forwards them. The routing infrastructure routes the packets to CN's home network 106, in which CN's HA (CHA) 104 intercepts and tunnels them to CN's CoA. Data packets in the other direction are handled accordingly.

FIGS. 1 and 4 show the same routing configuration for different distances between the respective networks. In FIG. 1, the MN's visited network 107 is closer to its home network 105 than the CN's visited network 108 to the CN's home network 106. In FIG. 4, both MN and CN are closer to each other than to their respective home network. It should further be noted that the visited network may in special cases be identical with the home network. If this is the case for one MN, this leads to a situation like shown in FIG. 1. If both MN and CN are in their respective home network, ORT may not provide a shorter routing than conventional mobile IP routing. However, for the purpose of location privacy, the overall routing procedure must be identical for all cases, at least from MN's and CN's point of view.

Figure 2:
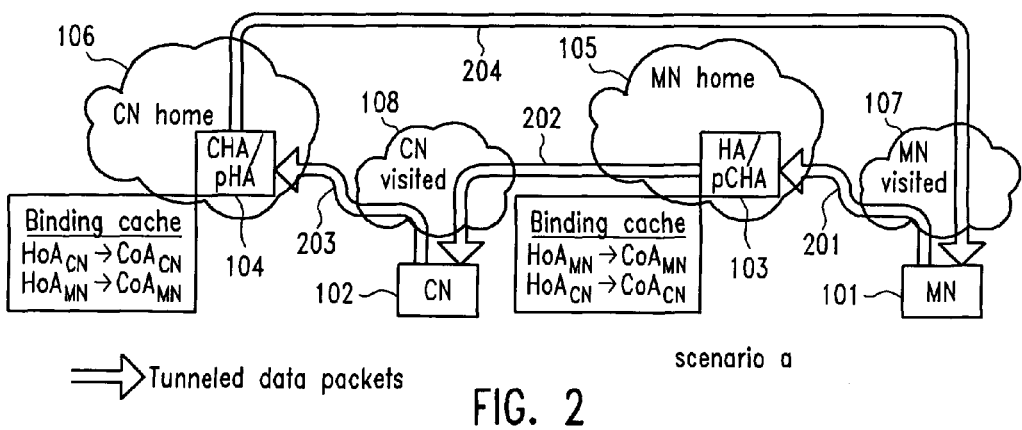
FIG. 2 depicts the data path with two uni-directional tunnelling proxy HAs located in the home networks (scenario a)
Figure 3:
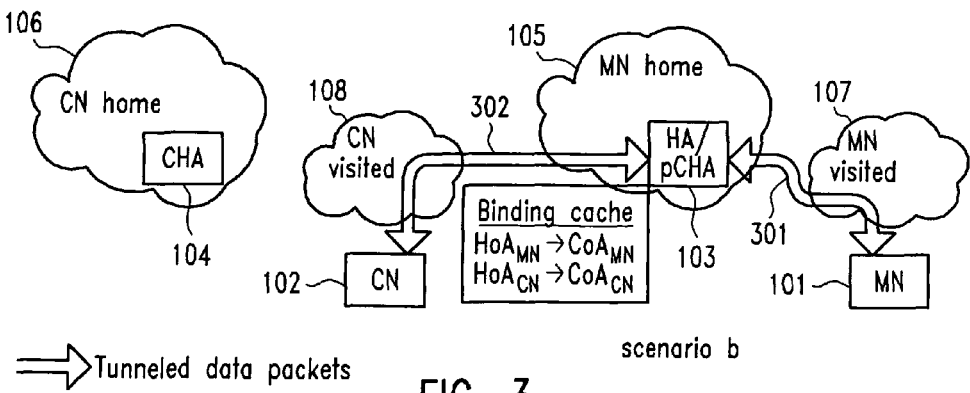
FIG. 3 illustrates the data path with one bi-directional tunnelling proxy HA located in the home network of the MN (scenario b)
Figure 5:
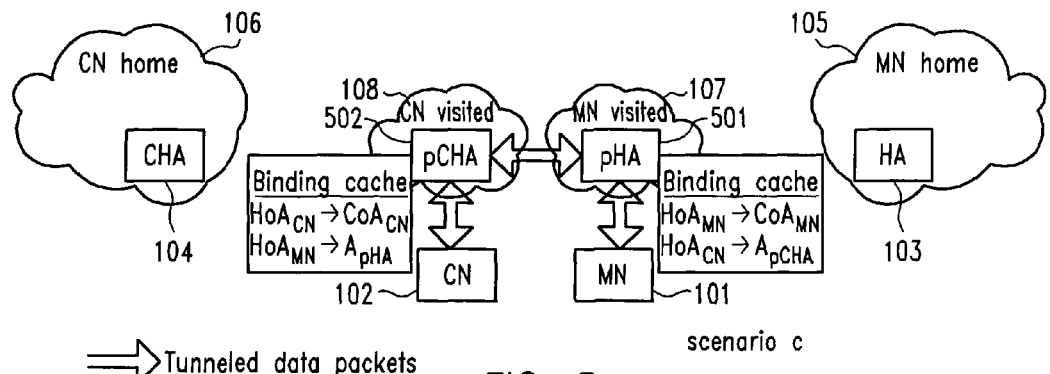
FIG. 5 shows the data path with two uni-directional tunnelling proxy HAs located in the visited networks of MN and CN (scenario c)
Figure 6:
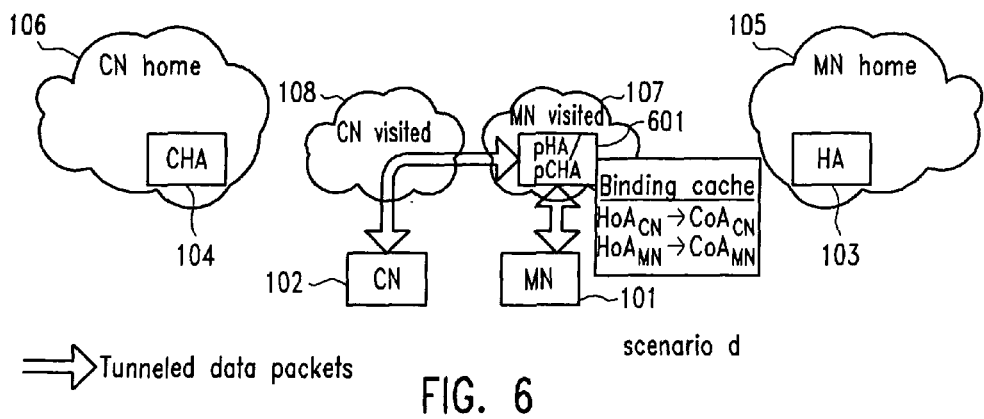
FIG. 6 illustrates the data path with one common bi-directional tunnelling proxy HA located in the visited network of the MN (scenario d)
Figure 7:
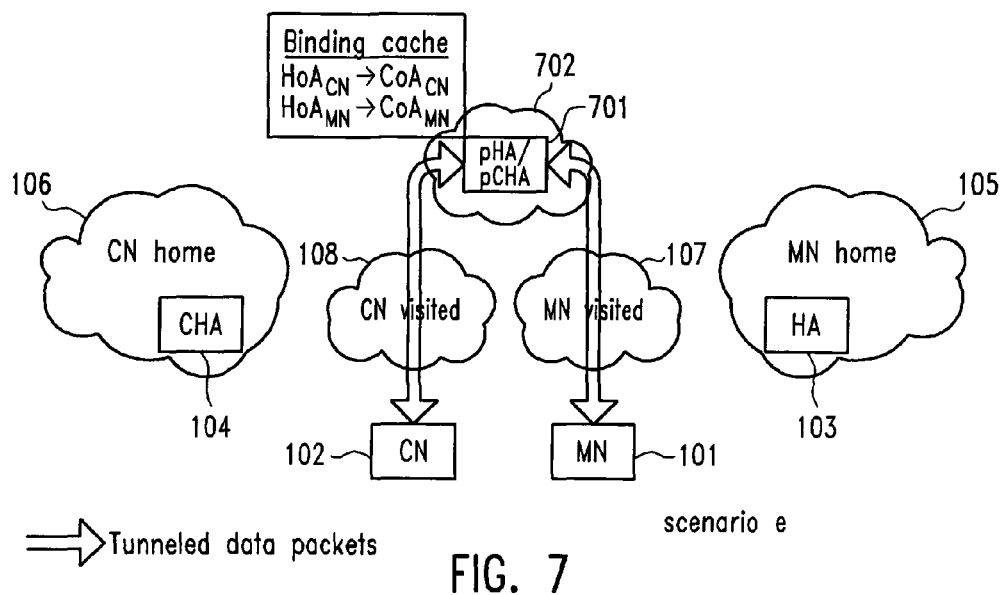
FIG. 7 depicts the data path with one common bi-directional tunnelling proxy HA located in a network between the visited networks of MN and CN (scenario e)

When MN or HA request ORT, the process starts with negotiating the route optimization and privacy requirements. The former can e.g. specify a maximum route length in hops, the latter can specify, if and what kind of privacy is required (hide MN's location to CN or to eavesdropper or prevent location tracking). Based on this information and additional distance information, CN's and MN's original HA select candidate scenarios for the route optimization. Not limiting the general concept to these scenarios, the following scenarios of different proxy HA locations are being discussed in the following:

a) Two unidirectional tunnelling proxy HAs 103 and 104 located in the home networks 105 and 106 of MN 101 and CN 102, respectively (see FIG. 2).

b) One bidirectional tunnelling proxy HA 103 or 104 located in the home network 105 or 106 of MN 101 or CN 102, respectively (see FIG. 3).

c) Two bidirectional tunnelling proxy HAs 501 and 502 located in the current visited networks 107 and 108 of the MN 101 and CN 102, respectively (see FIG. 5).

d) One common bidirectional tunnelling proxy HA 601 in the current visited network 107 or 108 of the MN 101 or CN 102 (see FIG. 6).

e) One common bidirectional tunnelling proxy HA 701 in a network 702 between the MN 101 and the CN 102 (see FIG. 7).

Scenarios a) and b) can be most advantageously applied in distance situations like shown in FIG. 1. In a situation like shown in FIG. 4, scenarios c), d) and e) may lead to a shorter route.

An ordered list of candidate scenarios can be constructed based on distance information and other information. The following principles can be used to select a target scenario: Scenario a) and b) may not achieve an optimal route length if both MN and CN are far away from home. Scenario c) and d) can be considered if scenario a) and b) do not achieve the extent of route optimization desired. However, they can only be used if the visited networks support this solution. Scenario d) may only be used if one of the nodes (the one in whose network the common proxy is located) has no privacy requirements, since the other node knows the prefix of this network from tunnelled packets received. Scenario e) can be used if both visited networks do not support ORT and both MN and CN have privacy requirements. The difficulty however is to determine a network between the visited networks that is able to provide a proxy HA.

Note that scenario b), d) and e) may not achieve complete location privacy if MN and CN know that the respective scenario is currently active. E.g. in FIG. 3, the CN 102 has some location information about the MN 101: CN knows that the path over the MN's HA 103 must be shorter than over the CN's HA 104 and it knows the distances to the MN's HA and the CN's HA. It can thus conclude whether the MN is closer to the MN's or to the CN's HA. As a countermeasure, either both the MN and the CN must not know which scenario is currently active or additional proxy HAs on the path must be used as intermediates.

Note that Mobility Anchor Points (MAP) in a network that supports HMIP can also co-locate a proxy HA.

Figure 8:
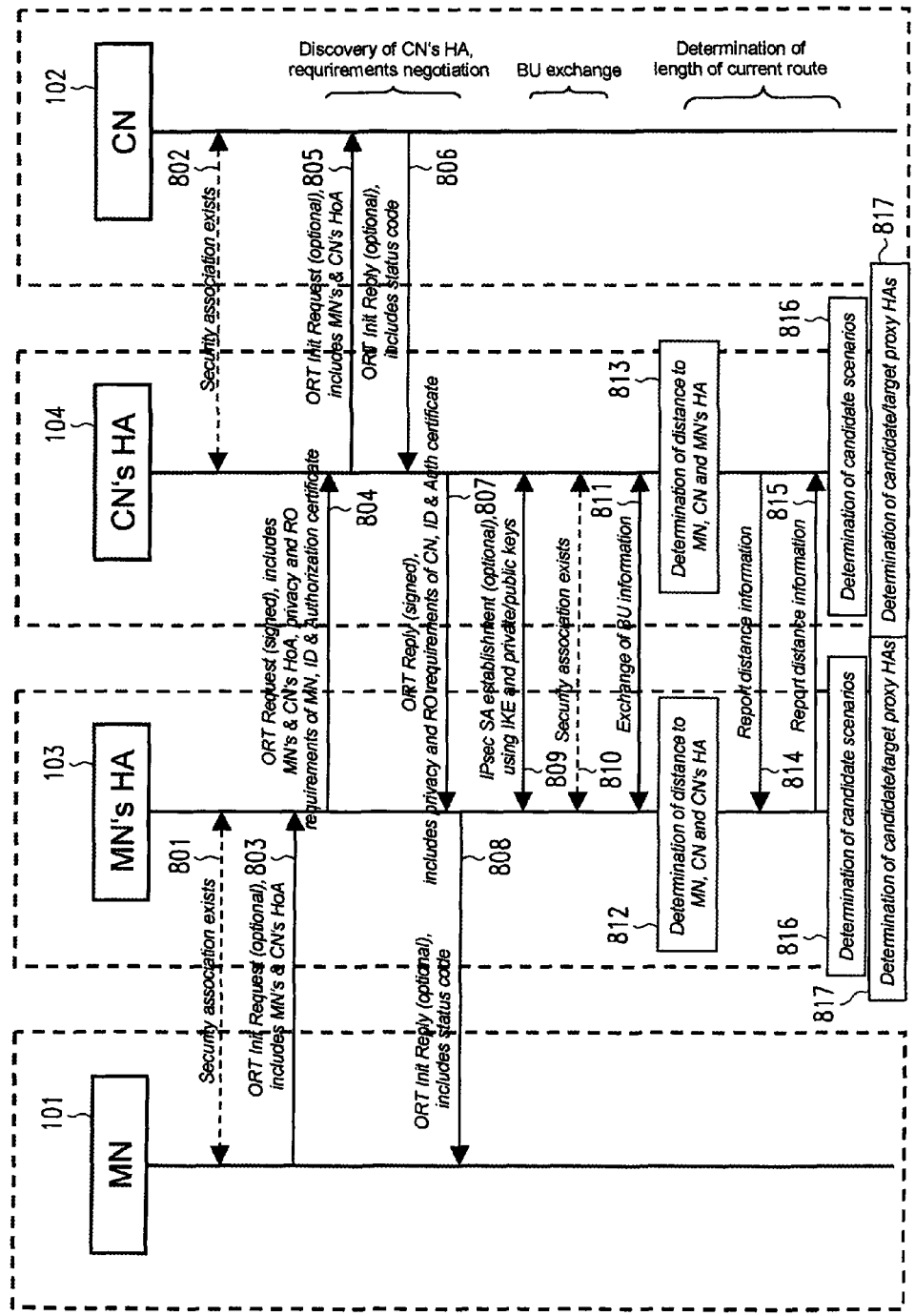
FIG. 8 shows the signalling flow for initial negotiation in scenario a)-e) in a HA-controlled variant.
Figure 9:
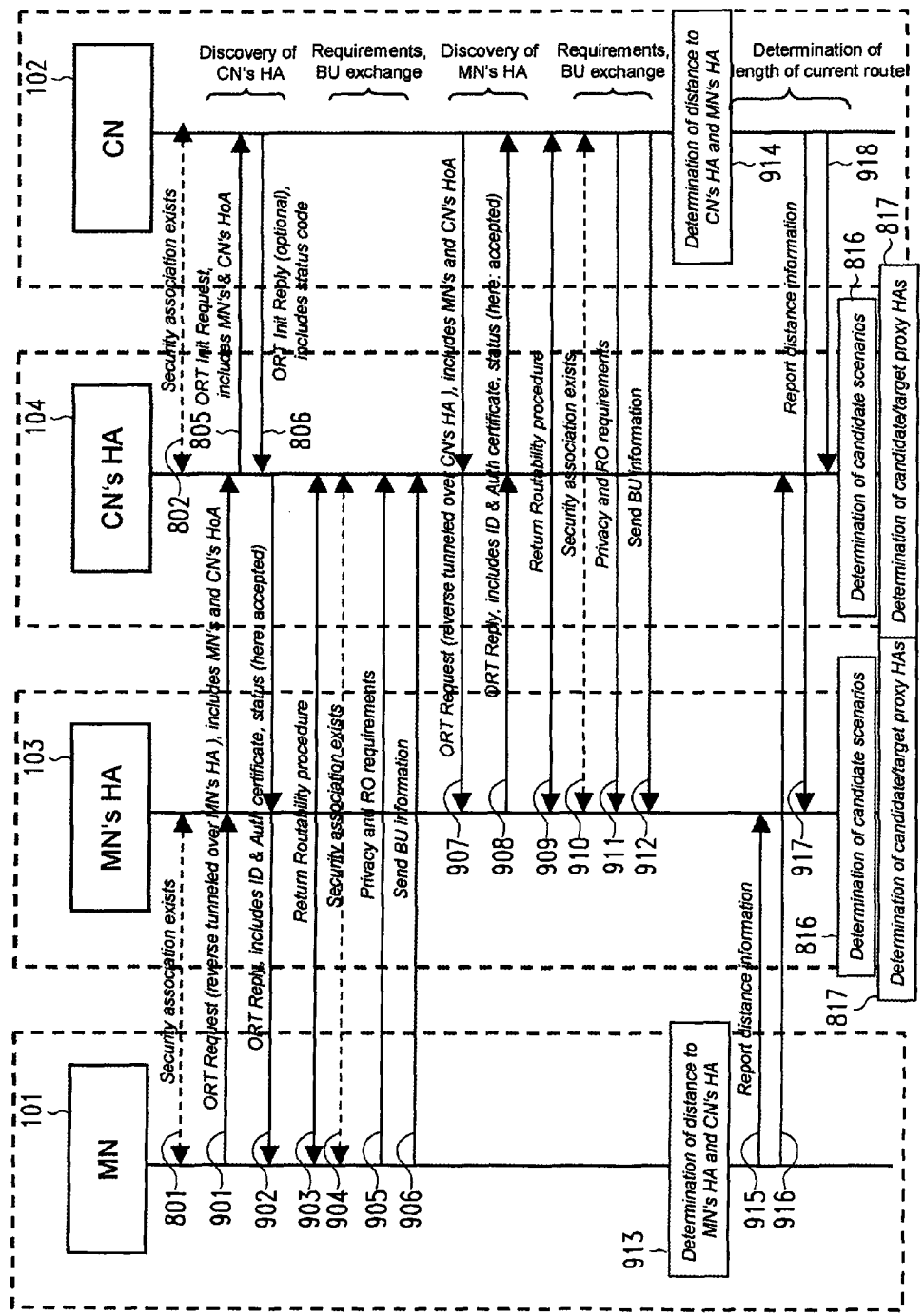
FIG. 9 illustrates the signalling flow for initial negotiation in scenario a)-e) in a MN-controlled variant.

Examples of an initial negotiation in the HA- and MN-controlled variant are shown in FIG. 8 and FIG. 9, respectively.

In both cases security associations 801, 802 exist already between each mobile node and its HA.

In the HA controlled variant shown in FIG. 8, the MN 101 may optionally send an ORT initialisation request 803 to its HA. This request comprises the home addresses of MN and CN. The MN's HA 103 then sends a signed ORT request 804 to the CN's HA 104, comprising the home addresses of both mobile nodes together with privacy and route optimization (i.e. maximum route length) requirements of the MN, an identifier of the MN's HA, like IP address, and an authorization certificate to prove that it is authorized to act as HA in its network. Upon receiving this request, the CN's HA 104 may optionally send an ORT initialization request 805 to the CN 102 and receive an ORT initialization reply 806 including a status code back from CN 102. The CN's HA 104 then sends back to the MN's HA 103 an ORT reply 807 to request 804. This reply is also signed and comprises privacy and route optimization requirements of the CN together with an identifier and an authorisation certificate of the CN's HA 104. In the case that the MN had sent ORT initialization request 803, it now receives a reply 808 thereto, including a status code, from its HA 103. If no security association 810 previously existed between both HAs 103 and 104, it is established in step 809 e.g. using Internet Key Exchange (IKE) and the private and public keys of both entities. Some kind of security association 110 is required for an integrity-protected exchange of binding update information between both HAs in step 811. This can also be achieved by signing the BU message directly with the public key of the correspondent. Next, each HA 103, 104 determines the distances to the respective other HA and to both the MN 101 and the CN 102 in steps 812 and 813 and reports the results to the respective other HA in steps 814 and 815. This information is used to determine the candidate scenarios in the HAs in step 816.

In the MN controlled variant shown in FIG. 9, ORT request 901, containing the home addresses of both mobile nodes, is mandatory. It is reverse tunnelled over the MN's HA to the CN's HA. The CN's HA 104 and the CN 102 may exchange an ORT initialization request 805 and optionally a reply thereto 806. In any case, the CN's HA 104 then returns to the MN 101 a reply 902 to ORT request 901, including an identifier of the CN's HA 104, an authorization certificate and status information whether the request has been accepted. If it has been accepted, MN 101 and CN's HA 104 carry out a return routability procedure 903. Thereafter, a security association 904 exists between MN 101 and the CN's HA 104. The MN sends privacy and route optimization requirements 905 and BU information 906 to the CN's HA. For the routing of data packets from the CN to the MN's HA steps 907-912 symmetric to steps 901-906 are performed. In the MN controlled case the MN 101 and the CN 102 determine the routing distances to both HAs 103, 104, respectively in steps 913 and 914 and report this information to both HAs in steps 915-918. This information is used to determine the candidate scenarios in the HAs in step 816.

Discovery of Candidate Proxy HAs

After candidate scenarios have been determined, candidate proxy HAs are discovered. First, the prefix of these HAs must be known. In scenario a) and b), the prefixes can be derived from the MN's and CN's HoA and in scenario c) and d) they can be derived from the MN's and CN's CoA. In scenario e), the prefixes are more difficult to determine. One option is to trigger a traceroute procedure between an HA in the MN's and the CN's visited network in order to discover prefixes of intermediate networks. Another option is to configure a list of candidate proxy HA prefixes in each HA and try to find suitable candidates out of this list. Since this requires a significant amount of signalling and is likely to be unsuccessful, scenario e) should only be used if all other scenarios cannot be applied.

When the prefixes are known, the IP address of a specific candidate proxy HA must be determined. In the special case where the prefix matches the current visited network, the proxy HA can be discovered by local means, e.g. with information contained in Router Advertisement (RA) messages. Otherwise, DNS could be used, but this would require that all HA addresses and their prefixes are stored in the DNS. Currently, this is not the case. Another option is to use a modified version of Dynamic Home Agent Address Discovery (DHMD) described in RFC 3775, which uses anycasting. Note that if multiple HAs exist on a link, the specific HA on the link must be found, which currently is the destination of a tunnel of a specific MN or CN. In scenario a) and b) this can e.g. be achieved by sending the Request message to CN's HoA and enabling CN's HA to intercept the Request.

Selecting Target proxy HA(s)

After candidate proxy HAs have been determined, specific target proxy HAs must be chosen. This can be done based on distance information, e.g. when changing from a scenario with two proxies to a scenario with one proxy, the one providing the shorter route is selected. Therefore, the distances MN↔pHA1, CN↔pHA1, MN↔pHA2 and CN↔pHA2 with pHA1 and pHA2 being candidate proxy HAs are measured by MN, CN and HAs. Distance can be expressed in number of hops, but could also be defined by other metrics like packet delay. The number of hops can passively be derived from the hop limit field in the IP header of signalling messages or tunnelled data packets or it can actively be measured by sending probe messages. The passive approach may require including the initial hop limit value, which was used by the sender, in the message, e.g. as new mobility option, since this value may be unknown to the receiver. Probe messages can be sent by the MN and/or by the HA. However, it must be considered that distances involving the CN should not be revealed to the MN, since this enables the MN to derive the CN's location to some extent. The MN's and the CN's (original) HAs collect all distance information and decide, which pHA provides the shorter route: if (MN↔pHA1)+(pHA1↔CN)<(MN↔pHA2)+ (pHA2↔CN), pHA1 is better in terms of route optimization, otherwise pHA2 is better. Distance information can also be cached in HAs to save the signalling effort in future ORT sessions of other nodes.

An example of a signalling flow for collecting distance information is shown in initial negotiation flow in FIG. 8 and FIG. 9, and described above.

Establishing Binding Information in a Target Proxy HA

Once the address of a target proxy HA is known, a Binding Update (BU) message can be sent to this address, by the MN in the MN-controlled variant or its HA in the HA-controlled variant. Note that after receiving the binding information, the proxy HA does not send proxy neighbour advertisements for the MN. The proxy functionality only refers to tunnelling on behalf the MN's original HA.

To send the binding information in a secure manner, various issues have to be considered. First, the injection of routes in an Internet router (here: proxy HA) by a malicious node must be prevented. Otherwise, this node can redirect traffic to another malicious node, e.g. to analyze or tamper the traffic and forward it back to the victim. An attacker could also redirect traffic to a victim that cannot handle the amount of traffic, e.g. because it has a low-bandwidth Internet connection.

To prevent that, the sender of the BU must authenticate at the proxy HA and, in case of the MN-controlled variant, it should prove that it really owns the claimed HoA. Additional reachability tests can be conducted to check if the MN actually owns the claimed CoA. Authentication and sender address ownership proof can be achieved with public/private keys and ID certificates: The ID certificate binds the public key to the sender address and the BU is signed with the private key. An alternative to ID certificates are Cryptographically Generated Addresses (CGA) [Aura, T., "Cryptographically Generated Addresses (CGA)", Internet-Draft draft-ietf-send-cga-06, April 2004], which bind the public key to the sender address. CGA only authenticates the interface identifier of the HoA, so that an additional reachability test should be conducted to prove that the prefix of the address is correct. Because key and certificate allocation requires considerable management effort, which grows with the number of allocations, this approach should only be applied to the HA-controlled variant. In this case, keys and certificates only need to be allocated to HAs, not to all MNs.

For the MN-controlled variant, CoA and HoA check and authentication of BU messages can be achieved by utilizing the return routability procedure used in route optimization mode described in RFC 3775. However, it is well-known that the return routability procedure in RFC 3775 is not resistant against attackers who are able to eavesdrop on both MN-CN and MN-HA-CN path. In RFC 3775, the path between MN and HA is protected by an IPSec SA. Thus, only the path between HA and CN is critical. Furthermore, attackers are usually on the edge of the network, because the routing infrastructure is well secured by the network operator. Thus the critical point for attacks is the point of attachment of the CN. This problem would especially be an issue in this invention, since routes are not only injected in a host (e.g. CN), but in Internet routers (here: proxy HA), which gives more options to an attacker. Fortunately, in contrast to RFC 3775, the procedure in this invention does not take place between the MN and the CN, but between the MN and the proxy HA, which is usually located within the network or routing infrastructure. Thus, the return routability procedure targeted at the proxy HA (as done in this invention) is considered more secure than targeted at the CN (as done in RFC 3775).

Another issue is that it should not be possible for a MN to successfully pretend to be a proxy HA in order to find out another MN's CoA (and thus its location). For this reason, the receiver of the BU message must prove to be a valid (proxy) HA of a network operator. This can be achieved with authorization certificates issued by the network operator. Such certificates are also used in [J. Arkko, J. Kempf, B. Sommerfeld, B. Zill, P. Nikander, "SEcure Neighbor Discovery (SEND)", IETF Internet Draft draft-ietf-send-ndopt-06, July 2004] or [M. Liebsch, A. Singh, H. Chaskar, D. Funato, E. Shim, "Candidate Access Router Discovery", IETF Internet Draft draft-ietf-seamoby-card-protocol-08.txt, September 2004]. Two certificates, an authorization and an ID certificate, can authorize the HA to serve as an HA for the network operator and bind a public key to the HA address. The public key can be used to initialize an IPsec security association between HAs for securing the BU information exchange in the HA-controlled variant. Instead of establishing an IPsec security association, signalling messages can also be signed directly with the private keys.

All these messages can be protected against replay attacks by adding nonces and/or timestamps to ORT request/reply messages. Resource exhaustion DoS attacks are another security issue. To prevent memory exhaustion, no state should be established in the HAs before the initiator of ORT has proven to be authentic. In the HA-controlled variant, the ORT request is signed and contains certificates which can provide this proof. In the MN-controlled variant, the ORT request does not establish states in the HA. State is only established after the return routability procedure, which provides this proof. However, the verification of certificates and public key signatures requires significant CPU resources, which could be exploited for a CPU exhaustions attack. This attack only affects HAs in the HA-controlled variant, since in the MN-controlled variant the MN only has to verify a certificate after sending a Request message. A countermeasure could be to first check on receipt of an ORT Request whether the target address is really the address of an CN managed by the receiving HA. If this is not the case, the Request can be denied without checking the certificate. This way, an attacker first needs have some knowledge about the victim's Binding Cache. ORT Reply messages should only be processed if a corresponding Request (indicated by Sequence Number) with valid certificate has been sent before. Another countermeasure is to set a limit on the amount of resources the receiver of ORT Request messages uses for verifications. This approach is also used as a countermeasure for a similar attack ("unnecessary binding updates attack") against the Mobile IPv6 Route Optimization mode (see Nikander, P., "Mobile IP version 6 Route Optimization Security Design Background," October 2004).

Reflection attacks with amplification are prevented by ensuring that replies/acknowledgements are always replied with a single packet of about the same or smaller size and are sent to the sender address of the request.

Note that any signalling message sent between the MN and the proxy HA, e.g. a BU message after movement, should be sent authenticated by using the security association established before. In the MN-controlled variant, the MN and proxy HA have a direct security association, whereas in the HA-controlled variant this is not the case. Thus, all signalling messages must go over the MN's original HA to the current proxy HA. Also, when a MN moves, it still sends the BUs to its original HA. In the HA-controlled variant, the original HA then forwards the BU to the proxy HA. In the MN-controlled variant, the MN itself sends BUs to both, its original and its proxy HA.

Figure 11:
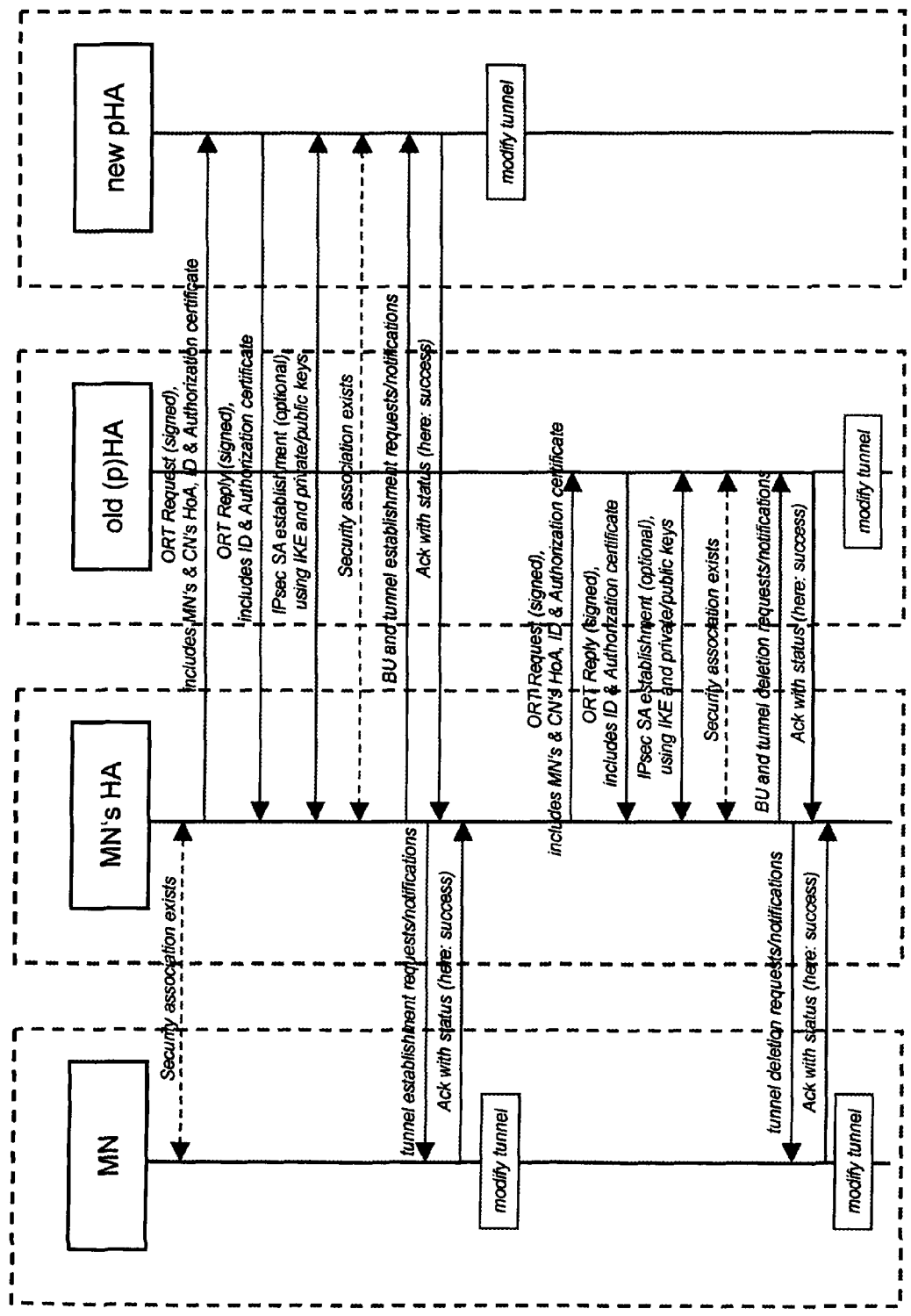
FIG. 11 shows the signalling flow for BU exchange and tunnel switching in scenario c)-e), HA-controlled.
Figure 12:
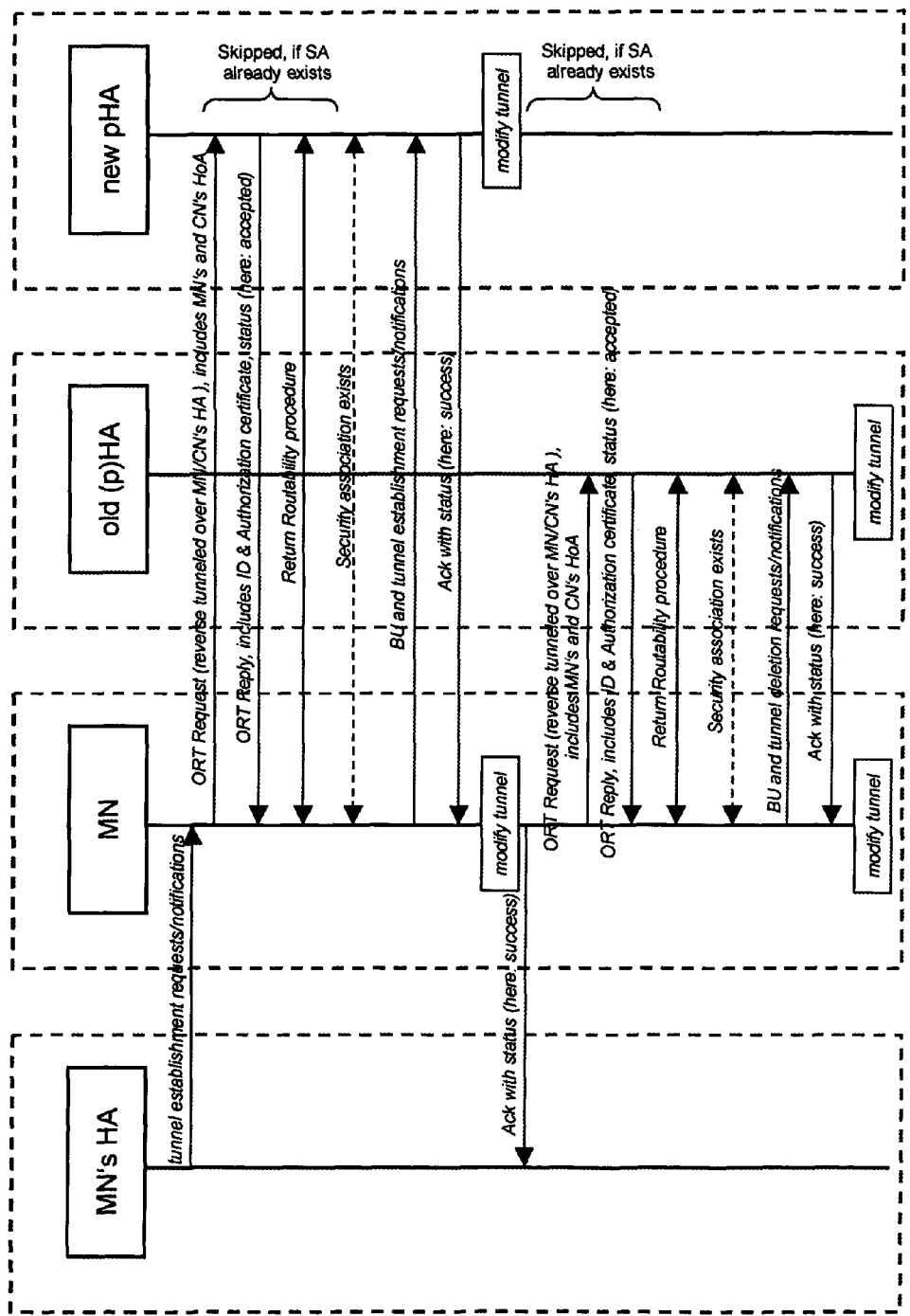
FIG. 12 illustrates the signalling flow for BU exchange and tunnel switching in scenario c)-e), MN-controlled.

Examples of signalling flows for achieving scenario c)-e) in the HA- and MN-controlled variant, respectively, are shown in FIG. 11 and FIG. 12. If the target scenario is a) or b), binding information has already been sent to the proxy HAs during the initial negotiation.

Switching Tunnel endpoints to/from a Target Proxy HA

After the binding information is established in the target proxy HA, tunnel endpoints can be switched to this target proxy in order to optimize the path. An individual IP-in-IP tunnel is always unidirectional and therefore has an entry point or source and an exit point or destination. The establishment or deletion of an IP-in-IP tunnel usually only requires action on the entry point of the tunnel. However, the exit point should be informed, since it may compare the source of tunnelled packets with the expected tunnel entry point. The general mechanism for IPv6 tunnelling is specified in RFC 2473.

Two types of tunnel switches can be distinguished. Either
1) the source of a tunnel is moved from one proxy HA to another or
2) the destination of a tunnel is moved from one proxy HA to another.

A tunnel establishment request message is sent to the new source of the tunnel, a tunnel delete request message is sent to the current source of the tunnel. Furthermore, a tunnel switch notification message is sent to the destination of the new tunnel. All tunnel request messages contain the address of the corresponding end point of the tunnel. Usually, a proxy HA is the source of a tunnel of one node and a destination of a tunnel of the other node. If possible, the messages can be aggregated with other messages. Every switch of a tunnel (e.g. MN-pHA) should be synchronized with the switch of the tunnel of the corresponding node (e.g. pHA-CN), in order to prevent packet loss on the entire MN-CN path. Therefore, every request/notification message must be replied with an acknowledge message which contains a status code. This status code may only indicate a successful tunnel establishment, if both incoming and outgoing tunnels of the proxy HA are set up. Furthermore, MN and CN should not switch their outgoing tunnel before the status indicates the successful setup of the entire MN-CN path.

Note that data packets coming from or sent to other nodes are still routed over the original HAs by default. Since tunnel switches only apply to a specific MN-CN communication session, the forwarding function in proxy HAs should also consider the source address in IP headers.

Figure 10:
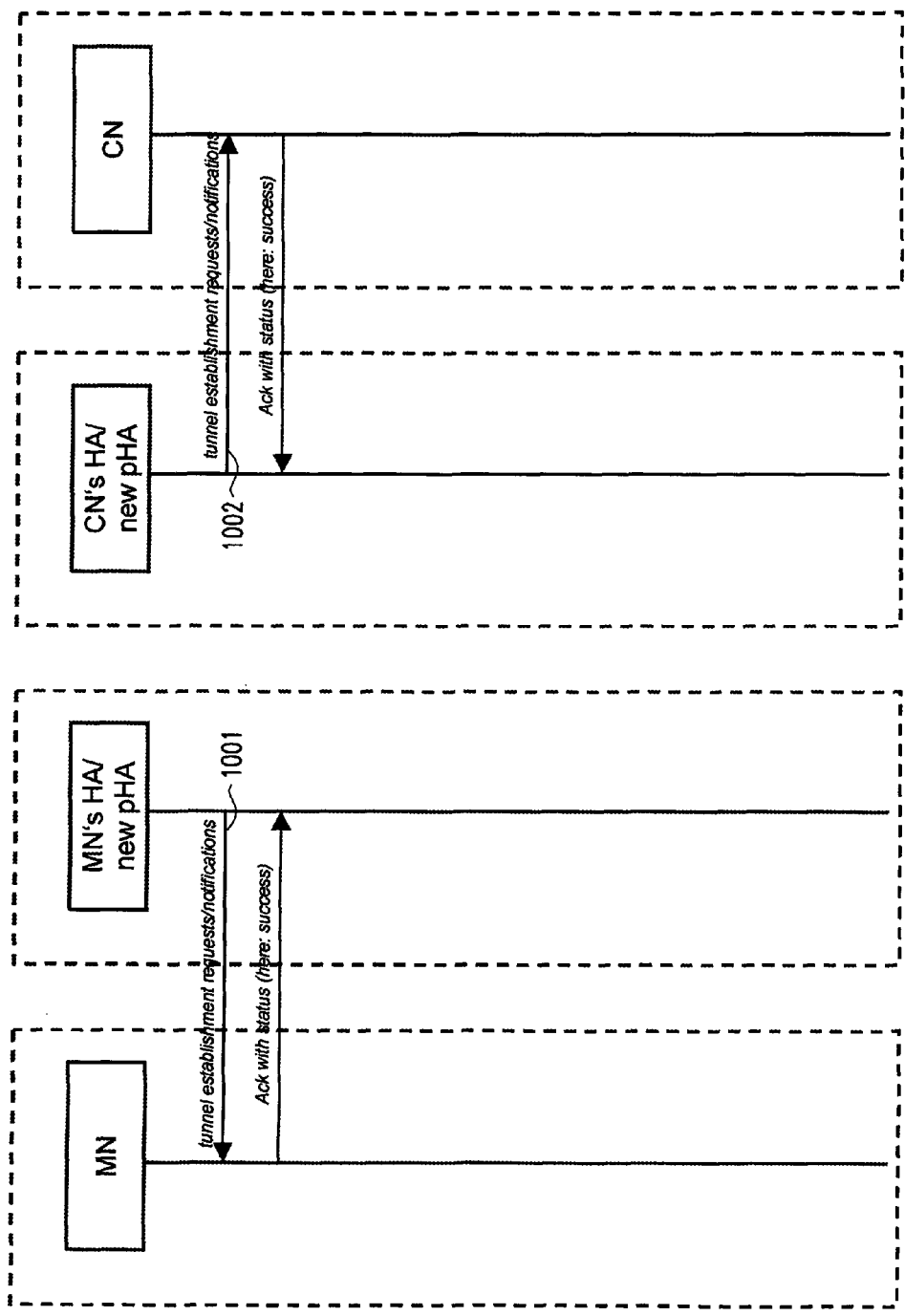
FIG. 10 depicts the signalling flow for tunnel switching in scenario a) and b), HA- and MN-controlled.

Example of signalling flows for the HA- and MN-controlled variant are shown in FIG. 10 for scenario a) and b) and FIG. 11 and FIG. 12 for scenario c)-e), respectively.

Path Adaptation in the Presence of Mobility

Generally, ORT can be performed in the background at any time. It can be triggered just after connection establishment with the communication partner or later on demand. Since the MNs can be mobile, the optimized route length can become sub-optimal after some time and a re-execution of ORT will be required. However, since some signalling is required, the procedures should be repeated as infrequently as possible and only if the communication session lasts for a longer time span. Furthermore, the procedures should not be executed when the benefit is low, i.e. if the path is not or only marginally shortened.

The benefit can be determined by repeating the procedure of measuring the route lengths over candidate proxy HAs. Potentially, the target scenario has to be changed, too. One approach is to repeat the distance measurement procedure described further above periodically. This is considered efficient when both MNs are constantly moving and the difference between the current and the optimized path is growing roughly in a linear way. Another way is to trigger the re-execution after every handover or every Nth handover. This is considered efficient if the mobility is low and handovers are rare.

Figure 13:
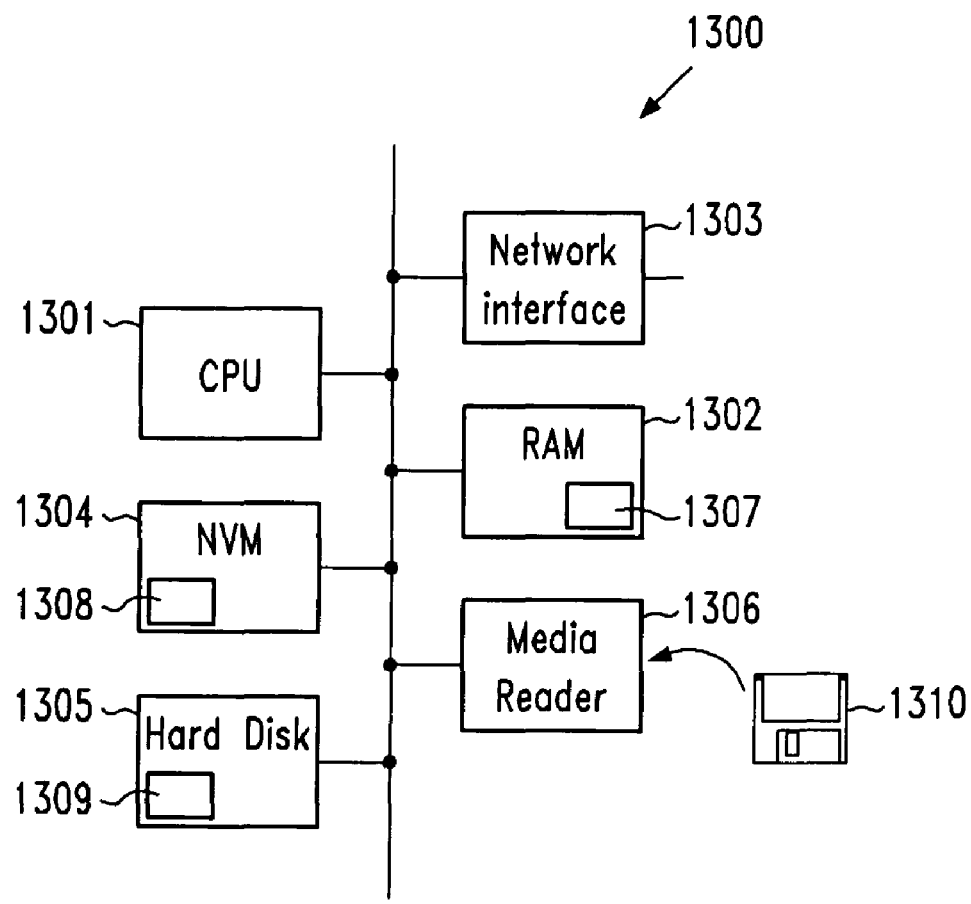
FIG. 13 depicts the structure of a network server which could be used as a HA.

FIG. 13 illustrates a basic structure of a network server 1300 which may be configured to serve as a home agent for MNs in a packet switched mobile communication system. It can be further configured to carry out method steps described above as the (first) MN's HA, the CN's HA, or as any proxy HA. In a very generic implementation, the server is configured to support several or all of the tasks and alternatives described above.

Network server 1300 comprises a processing unit 1301, random access memory 1302 and at least one network interface 1303 to connect it to the packet switched network. It may further comprise non-volatile semiconductor memory 1304 and/or a magnetic or optical hard disk drive 1305. Optionally a reader for any kind of magnetic, optic or semiconductor storage media may be included for the purpose of initial program loading or program update. Network server 1300 may comprise further optional components not shown here like display screen or keyboard.

Binding caches 1307, 1308 and 1309 for storing bindings between HoAs and CoAs of MNs may be reserved memory space in one or several of RAM 1302, NVM 1304 and hard disk 1305.

Network server 1300 may be configured to carry out method steps described above, by executing on its CPU 1301 program instructions stored in RAM 1302, NVM 1304 and/or hard disk 1305. These instructions may be stored for download to these memory locations on any other computer readable storage medium 1310 which can be read by media reader 1306. Such a medium might be a CD (compact disk), DVD (digital versatile disk), floppy disk or semiconductor memory card.

The invention might also apply to other mobility management protocols and systems, in which data packets are routed over some kind of mobility agent which is responsible for mapping the MN's locator to a permanent identifier.

List of Abbreviations
AR Access Router
BU Binding Update
CN Corresponding Node
CoA Care-of-Address
CHA Home Agent of Corresponding Node
CGA Cryptographically Generated Address
DHAAD Dynamic Home Agent Address Discovery
DNS Domain Name System
HA Home Agent
HMIP Hierarchical Mobile Internet Protocol Version 6
HN Home Network
HoA Home Address
IKE Internet Key Exchange
LPA Location Privacy Agent
LCS Location Privacy Server
MAP Mobility Anchor Point
MN Mobile Node
ORC Optimized Route Cache Protocol
ORT Optimized Reverse Tunnelling
pHA Proxy Home Agent
RA Router Advertisement
RcoA Regional Care-of-Address
RO Route Optimization
SEND Secure Neighbor discovery
VoIP Voice over Internet Protocol

The invention claimed is:

1. A method for packet switched data transmission between a first mobile node and a correspondent mobile node in a mobile communication system comprising a plurality of mobile networks, the method comprising the steps of:

a) allocating a respective home network to each of the first mobile node and the correspondent mobile node;
b) providing a network server as a home agent in the respective home networks of each of the first mobile node and the correspondent mobile node;
c) determining distances from the home agent of the first mobile node to the first mobile node and to the correspondent mobile node;
d) determining distances from the home agent of the correspondent mobile node to the first mobile node and to the correspondent mobile node;
e) selecting, using the determined distances in steps c) and d), one of the two home agents as an end point of a first bidirectional tunnel and as a start point of a second bidirectional tunnel;
f) routing data packets from the first mobile node to the correspondent mobile node over the first bidirectional data tunnel from the first mobile node to the selected home agent and over the second bidirectional data tunnel from the selected home agent to the correspondent mobile node without passing the other of the two home agents which is not selected.

2. The method according to claim 1, wherein the selected home agent is the home agent of the first mobile node, and the method further comprises the step of:
g) routing the data packets from the correspondent mobile node to the first mobile node over a third data tunnel from the correspondent mobile node to the home agent of the correspondent mobile node and over a fourth data tunnel from the home agent of the correspondent mobile node to the first mobile node without passing the home agent of the first mobile node.

3. The method according to claim 1, wherein the selected home agent is the home agent of the first mobile node, and the method further comprises the step of:
h) routing the data packets over the second bidirectional data tunnel and the first bidirectional data tunnel from the correspondent mobile node to the first mobile node.

4. The method of claim 1, further comprising, after step d) and before step e), a step of exchanging distance information between the home agent of the first mobile node and the home agent of the correspondent mobile node.

5. The method according to claim 1, wherein steps c) to e) are repeated in predetermined time intervals or after a predetermined number of handovers.

6. The method according to claim 1, further comprising a step of sending, after step e), a tunnel establishment request or notification message from the home agent of the first mobile node to the first mobile node.

7. The method according to claim 1, further comprising, prior to step f), and, if applicable, prior to step c), the steps of:
j) sending, from the home agent of the first mobile node, a message to the home agent of the correspondent mobile node, the message comprising home addresses of the first mobile node and the correspondent mobile node;
k) sending a signed reply from the home agent of the correspondent mobile node to the home agent of the first mobile node, the reply comprising a certified identifier and an authorization certificate of the home agent of the correspondent mobile node;
l) establishing a security association between the home agent of the first mobile node and the home agent of the correspondent mobile node; and
m) sending binding update information comprising a care-of-address and a home address of the first mobile node, from the home agent of the first mobile node to the home agent of the correspondent mobile node, using said established security association, and storing the binding update information in the home agent of the correspondent mobile node.

8. The method according to claim 1, further comprising, prior to step f), and, if applicable, prior to step c), the steps of:
n) sending, from the first mobile node, a message to the home agent of the correspondent mobile node, the message comprising home addresses of the first mobile node and the correspondent mobile node;
o) sending a signed reply from the home agent of the correspondent mobile node to the first mobile node, the reply comprising a certified identifier and an authorization certificate of the home agent of the correspondent mobile node;
p) establishing a security association between the first mobile node and the home agent of the correspondent mobile node; and
q) sending binding update information comprising a care-of-address and a home address of the first mobile node, from the first mobile node to the home agent of the correspondent mobile node, using said established security association established in step p), and storing the binding update information in the home agent of the correspondent mobile node.

9. The method of claim 8, further comprising, before step p), a step of executing a return routability procedure between the first mobile node and the home agent of the correspondent mobile node.

10. The method according to claim 1, further comprising the steps of:
u) providing at least one of the following further routing options for the packet switched data transmission between the first mobile node and the correspondent mobile node and vice versa, using proxy home agents which store binding information of mobile nodes each allocated to a different network than the network of the respective proxy home agent:
i) a bidirectional data tunnel from the first mobile node to a proxy home agent in a visited network of the first mobile node, on to a proxy home agent in a visited network of the correspondent mobile node and on to the correspondent mobile node without passing any of the home agents of the first mobile node and the correspondent mobile node, wherein at least one of the proxy home agents is not an access router;
ii) a bidirectional data tunnel from the first mobile node to a proxy home agent in the visited network either of the first mobile node or of the correspondent mobile node and on to the correspondent mobile node without passing any of the home agents of the first mobile node and the correspondent mobile node; and
iii) a bidirectional data tunnel from the first mobile node to a proxy home agent in a network located between the visited network of the first mobile node and the visited network of the correspondent mobile node and on to the correspondent mobile node without passing any of the home agents of the first mobile node and the correspondent mobile node; and
v) selecting between at least two of the routing options comprising routing the data packets from the first mobile node to the correspondent mobile node, over a first data tunnel from the first mobile node to any first one of the home agents and over a second data tunnel from said first one of the home agents to the correspondent mobile node without passing the respective other home agent, routing the data packets from the correspondent mobile node to the first mobile node over a third data tunnel from the correspondent mobile node to the home agent of the correspondent mobile node and over a fourth data tunnel from the home agent of the correspondent mobile node to the first mobile node without passing the home agent of the first mobile node, and routing the data packets over the second data tunnel and the first data tunnel from the correspondent mobile node to the first mobile node and sub-steps i) to iii).

11. The method according to claim 10, wherein steps v) and c) to e) are repeated in predetermined time intervals or after a predetermined number of handovers.

12. A network server configured to serve as a home agent for a first mobile node sending data packets to a correspondent mobile node in a mobile communication system comprising a plurality of mobile networks, the network server being further configured to establish a data tunnel directly to said correspondent mobile node without passing a home agent of said correspondent mobile node, for the purpose of forwarding data packets received from said first mobile node to said correspondent mobile node, the network server being further configured:
    to establish said data tunnel as a bidirectional data tunnel,
    to determine distances to said first mobile node and to said correspondent mobile node;
    to receive, from the home agent of the correspondent mobile node, information about distances from the home agent of the correspondent mobile node to the correspondent mobile node and to the first mobile node; and
    to select, using the determined distances and the received information, one of the two home agents for said forwarding of data packets.

13. The network server of claim 12, further configured to receive the data packets from said correspondent mobile node via said data tunnel, and to forward said received data packets to said first mobile node.

14. The network server of claim 12 comprising a binding cache and being further configured:
    to send a message to the home agent of the correspondent mobile node, the message comprising home addresses of the first mobile node and the correspondent mobile node;
    to receive a signed reply from the home agent of the correspondent mobile node, the reply comprising a certified identifier and an authorization certificate of the home agent of the correspondent mobile node;
    to establish a security association to the home agent of the correspondent mobile node; and
    to receive, from the home agent of the correspondent mobile node and using said established security association, binding update information comprising a care-of-address and a home address of the correspondent mobile node, and to store the binding update information in the binding cache.

15. The network server of claim 12, further configured to send a tunnel establishment request or notification messages to the first mobile node.

16. The network server of claim 12, further configured:
    to receive a message from the home agent of the correspondent mobile node, the message comprising home addresses of the first mobile node and the correspondent mobile node;
    to send a signed reply to the home agent of the correspondent mobile node, the reply comprising an identifier of the home agent of the correspondent mobile node and an authorization certificate;
    to establish a security association to the home agent of the correspondent mobile node; and
    to send, to the home agent of the correspondent mobile node and using said established security association, binding update information comprising a care-of-address and a home address of the correspondent mobile node.

17. The network server of claim 12 comprising a binding cache and being further configured:
    to establish a security association with the correspondent mobile node; and
    to receive binding update information comprising a care-of-address and a home address of the correspondent mobile node, from the correspondent mobile node using said established security association, and to store the binding update information in the binding cache.

18. The network server of claim 17, further configured to execute a return routability procedure with the correspondent mobile node.

19. A computer-readable storage medium having stored thereon instructions which, when executed on a processor of a network server, cause the network server to serve as a home agent for a first mobile node sending data packets to a correspondent mobile node in a mobile communication system comprising a plurality of mobile networks, and to establish a data tunnel directly to said correspondent mobile node without passing a home agent of said correspondent mobile node, for the purpose of forwarding data packets received from said first mobile node to said correspondent mobile node, and which further cause the network server:
    to establish said data tunnel as a bidirectional data tunnel,
    to determine distances to said first mobile node and to said correspondent mobile node,
    to receive, from the home agent of the correspondent mobile node, information about distances from the home agent of the correspondent mobile node to the correspondent mobile node and to the first mobile node; and
    to select, using the determined distances and the received information, one of the two home agents for said forwarding of data packets.

* * * * *